Figure 1:
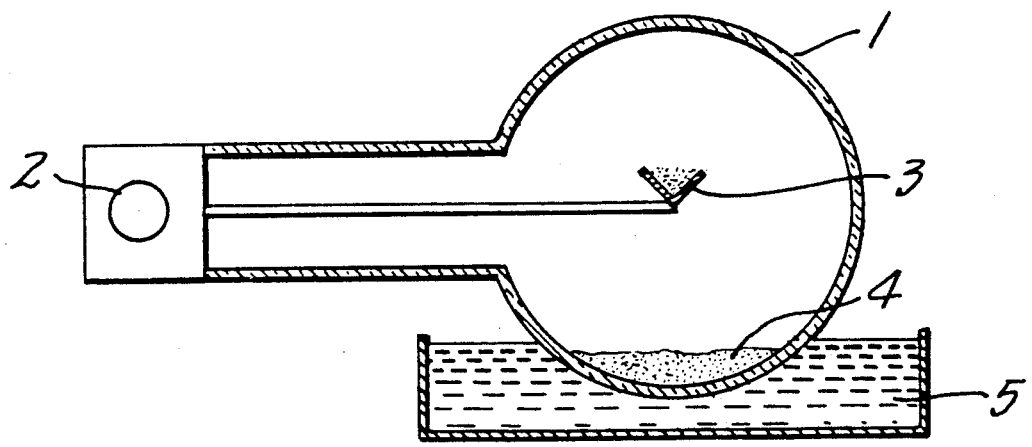

United States Patent [19]
Timms et al.

[11] Patent Number: 5,034,554
[45] Date of Patent: Jul. 23, 1991

[54] POLYSILOXANE OILS AND PROCESS FOR THEIR PREPARATION

[75] Inventors: Peter L. Timms, Bristol; William N. Rowlands, Cheshire, both of Great Britain

[73] Assignee: Elkem a/s, Norway

[21] Appl. No.: 546,027

[22] Filed: Jun. 28, 1990

[30] Foreign Application Priority Data

Jun. 30, 1989 [GB] United Kingdom ............. 8915088.2

[51] Int. Cl.$^5$ ................................................. C07F 7/08
[52] U.S. Cl. ..................................... 556/451; 556/452
[58] Field of Search ......................... 332/451; 556/452

[56] References Cited

U.S. PATENT DOCUMENTS 3,660,450  5/1972  Timms .............................. 260/448.2
3,660,451  5/1972  Schascheld ......................... 560/452

Primary Examiner—Paul F. Shaver
Attorney, Agent, or Firm—Lucas & Just

[57] ABSTRACT

A process for producing a polysiloxane oil with aryl groups and oxygen atoms as co-substituents on the silicon atoms. Silicon monoxide gas is reacted under a vacumm with iodine and an aromatic compound such as toluene in solution at a low temperature in the region of −75° C. to −95° C.

19 Claims, 1 Drawing Sheet

POLYSILOXANE OILS AND PROCESS FOR THEIR PREPARATION

The present invention relates to the production of polysiloxane oils using silicon monoxide and aromatic compounds.

From U.S. Pat. No. 3,660,450 it is known how to prepare an organo substituted polysiloxane polymer by condensing together the vapour of silicon monoxide with the vapour of unsaturated or aromatic organic compounds on a surface cooled to −196° C. to −70° C. under vacuum. In all cases reported in the patent, the products are intractable solid polymers, insoluble in organic solvents. Due to these properties of the products, this method and the products have found no commercial interest.

It is an object of the present invention to provide a polysiloxane oil by a reaction involving gaseous silicon monoxide and a liquid aromatic compound.

According to the invention, there is provided a polysiloxane oil which is a reaction product of silicon monoxide, iodine and an aromatic compound, the polysiloxane oil having iodo and aryl substituents on the silicon.

This may be obtained by evaporating the silicon monoxide under vacuum into a solution containing the iodine dissolved in a liquid the aromatic compound in liquid form, the aromatic compound having a vapour pressure at its melting point less than or equal to 0.01 mbar, or by evaporating the silicon monoxide under vacuum into a solution of an inert organic solvent containing the dissolved aromatic compound and the dissolved iodine, the inert organic solvent having a vapour pressure at its melting point of less than or equal to 0.01 mbar.

According to another aspect of the invention, there is provided a process for preparing a polysiloxane oil with iodo and aryl substituents on the silicon, in which silicon monoxide is reacted under vacuum with a solution containing iodine dissolved in a liquid aromatic compound or with a solution of an inert organic solvent containing a dissolved aromatic compound and dissolved iodine.

In a preferred form therefore the present invention may provide a new process by reacting gaseous silicon monoxide in a vacuum with a solution containing iodine dissolved in a liquid aromatic compound such as toluene or with a solution of an inert solvent containing a dissolved aromatic compound and dissolved iodine, and to form a product in the solution which is a polysiloxane with iodine atoms, aryl groups, such as tolyl groups, and sometimes hydrogen atoms as co-substituents with oxygen atoms on the silicon atoms.

Generally the polysiloxane obtained as reaction product is an oily substance. The Si-I bonds are extremely reactive and by reaction with organic ethers, esters or with lithium alkyls, the >Si—I groups can be converted to >Si—OR, >Si—OOCR, or >Si—R groups in high yields at low temperatures (where R is an organic radical). The resulting polysiloxanes, containing Si—aryl and sometimes Si—H bonds in addition to Si—OR, Si—OOCR or Si—R bonds, are then polysiloxanes akin to compounds of known commercial importance.

Solid silicon monoxide can be obtained commercially and gaseous SiO can be prepared by heating this or by reducing $SiO_2$ with Si, SiC, C etc. generally at a high temperature. The reduction of $SiO_2$ with Si provides the maximum yield and this process is generally preferred for preparing the silicon monoxide, this process being characterised by its high reaction velocity and absence of secondary reactions that might possibly contaminate the final product.

Generally, only aromatic compounds which have a vapour pressure less than or equal to 0.01 mbar at their melting point can be used as solvents for iodine in the method of the present invention. Aromatic compounds which have a high vapour pressure at their melting point or which show a low solubility for iodine, may be dissolved together with iodine in an inert solvent for reaction with SiO. In this case, both the vapour pressure of the inert solvent at its melting point and the vapour pressure of the solution at this same temperature, must be less than or equal to 0.01 mbar.

Toluene is the preferred aromatic compound for use in the present invention. Other aromatic compounds such as ethylbenzene, n-propylbenzene, cumene and 1-methylnaphtalene can, however, also be used in the present invention.

When using toluene as an aromatic compound, the preferred temperature of the mixture of toluene and iodine is between −75° C. and −95° C. Higher temperatures can be used with less volatile aromatic compounds, e.g. the preferred temperature is between −65° C. and −95° C. for ethylbenzene and between −50° C. and −90° C. for n-propylbenzene. The reaction temperature for other aromatic compounds for use in the present invention can easily be determined by a person skilled in the art and will be at or above the freezing point of the compound and below the temperature at which the vapour pressure of the compound is 0.01 mbar.

At temperatures above −50° C., reactions of SiO with mixtures of an aromatic compound and iodine tend to give reduced yields of products containing silicon-aryl bonds; side reactions, such as iodination of the aromatic compound, become significant as the reaction temperature is raised.

Iodoethane, $C_2H_5I$, is the preferred inert organic solvent. Iodoethane has a melting point of −108° C. and can be used as a solvent for aromatic compounds and iodine in the temperature range of −95° C. to −108° C. Examples of other inert organic solvents which can be used are iodopropane at a temperature range of −85° C. to −100° C. and decalin at a temperature range of −50° C. to −65° C.

The mechanism by which toluene or one of the other aromatic compounds undergoes aromatic substitution in its reaction with SiO and iodine is not fully understood. It is possible than an electrophile such as $ISiO^+$ is produced from free $I_2$ and that this attacks the toluene solvent. Perhaps more likely, SiO reacts with $I_2$ molecules complexed between toluene molecules and this leads to a concerted electrophilic attack on toluene and releases HI. Part of the HI may be captured by reactions with more SiO giving the observed SiH bonds in the product.

The polysiloxane oil of the present invention comprises at least three types of groups which may form different kinds of rings and chains in the polymer.

From the reaction product obtained by reactions between $SiO+I_2+$toluene the following types of groups have been determined by spectroscopy, with groups of type (c) and (d) being the most abundant:

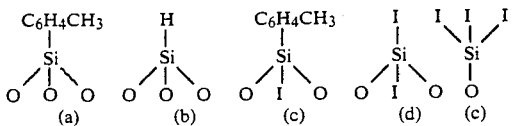

(a)  (b)  (c)  (d)  (e)

For reaction between SiO, I$_2$ and other aromatic compounds than toluene, the tolyl radical C$_6$H$_4$CH$_3$ will be substituted by other radicals.

One arrangement for carrying out the method of the invention is shown by way of example in FIG. 1.

FIG. 1 shows a glass flask 1 arranged to be rotated about a horizontal axis. The flask 1 is connected to a vacuum pump 2. A crucible 3 containing an SiO source is placed in the flask, the crucible having heating elements for vaporising the SiO(g) at a temperature of about 1300° C. The flask is partly filled with the aromatic compound containing dissolved iodine, shown by reference numeral 4. The flask is arranged to being rotated about an horizontal axis in a liquid cooling bath 5 which is kept at a temperature a little above the melting point of the mixture of the aromatic compound and iodine.

Before starting the reaction the glass flask 1 is evacuated by means of the vacuum pump. Then the evaporation of SiO(g) is started. Due to the rotation of the glass flask, a film of liquid will appear on the inner walls of the flask and the SiO gas will condense in this film and react with the liquid. The polysiloxane oil produced is contained in the liquid and is, when the reaction is finished, separated from any remaining reactants.

The method of the present invention can also be carried out in a stationary reaction unit containing the liquid solution of aromatic compound and iodine, by directed evaporation of SiO(g) into the cooled, stirred liquid solution.

The invention may be carried into practice in various ways as illustrated in the following non-limiting examples.

EXAMPLE 1

12.0 grams of iodine was crushed and dried under vacuum and dissolved in about 300 cm$^3$ waterfree degassed toluene. The solution was introduced into the glass flask described above in connection with FIG. 1. The flask was evacuated to a pressure below 0.01 mbar. While the flask was being rotated, approximately 4.0 g SiO was evaporated into the solution which was kept at $-90°$ C. The reaction appeared highly efficient and little or no siloxane polymer precipitated from the solution.

Removal of excess toluene and iodine under vacuum at room temperature yielded a colourless oil of molecular formula Si$_{20}$O$_{24}$I$_{17}$(C$_7$H$_7$)$_{11}$H$_4$ Spectroscopic examination by infrared and 1$_H$, 13$_C$ and 29$_{Si}$ n.m.r. techniques showed that the dominant groups in the product were the same groups as described above in connection with the reaction mechanism.

EXAMPLE 2

18 grams of cumene and 8.4 grams of iodine were dissolved in 150 cm$^3$ of iodoethane. The solution was placed in a glass flask as described in connection with FIG. 1. The flask was cooled to about $-105°$ C. and evacuated to a pressure below 0.01 mbar. Then 3.5 gram of SiO was evaporated into the solution which was kept at about $-105°$ C. The purple-brown solution lightened to orange and then yellow-orange as the reaction proceeded. At the end of the reaction, the flask was allowed to warm to room temperature with vacuum evaporation of iodoethane and excess cumene, to leave an oil product which was shown to be a polysiloxane with I—, H— and (CH$_3$)$_2$CHC$_6$H$_4$- groups as substituents on silicon by spectroscopic methods.

We claim:

1. A polysiloxane oil which is a reaction product of silicon monoxide, iodine and an aromatic compound, the polysiloxane oil having iodo and aryl substituents on the silicon.

2. An oil as claimed in claim 1 obtained by evaporating the silicon monoxide under vacuum into a solution containing the iodine dissolved in an aromatic compound in liquid form, the aromatic compound having a vapour pressure at its melting point less point less than or equal to 0.01 mbar.

3. An oil as claimed in claim 1 obtained by evaporating the silicon monoxide under vacuum into a solution of an inert organic solvent containing the dissolved aromatic compound and the dissolved iodine, the inert organic solvent having a vapour pressure at its melting point of less than or equal to 0.01 mbar.

4. An oil as claimed in claim 1 in which there are tolyl groups and optionally hydrogen atoms as co-substituents with oxygen on the silicon atoms.

5. A process for preparing a polysiloxane oil with iodo and aryl substituents on the silicon, in which silicon monoxide is reacted under vacuum with a solution containing iodine dissolved in a liquid aromatic compound or with a solution of an inert organic solvent containing a dissolved aromatic compound and dissolved iodine.

6. A process as claimed in claim 5, in which the reaction is carried out in a reactor kept at a pressure below 0.01 mbar.

7. A process as claimed in claim 5 in which the aromatic compound has a vapour pressure at its melting point less than or equal to 0.01 mbar.

8. A process as claimed in claim 5 in which the inert organic solvent has a vapour pressure at its melting point less than or equal to 0.01 mbar.

9. A process as claimed in claim 5 in which the aromatic compound is toluene and that the reaction temperature is kept between $-75°$ C. and $-95°$ C.

10. A process as claimed in claim 5 in which the aromatic compound is ethylbenzene and that the reaction temperature is kept between $-65°$ C. and $-95°$ C.

11. A process as claimed in claim 5, in which the aromatic compound is n-propylbenzene and that the reaction temperature is kept between $-50°$ C. and $-90°$ C.

12. A process as claimed in claim 5, in which the aromatic compound is cumene dissolved in an inert organic solvent.

13. A process as claimed in any of claim 5, in which the aromatic compound is 1-methylnaphtalene dissolved in an inert organic solvent.

14. A process as claimed in claim 5, in which iodoethane is used as an inert organic solvent and that the reaction temperature is kept between $-95°$ C. and 108° C.

15. A process as claimed in claim 6 in which the aromatic compound has a vapour pressure at its melting point less than or equal to 0.01 mbar.

16. A process as claimed in claim 6 in which the inert organic solvent has a vapour pressure at its melting point less than or equal to 0.01 mbar.

17. A process as claimed in claim 6 in which the aromatic compound is cumene dissolved in an inert organic solvent.

18. A process as claimed in claim 6 in which the aromatic compound is 1-methylnaphtalene dissolved in an inert organic solvent.

19. A process as claimed in claim 6 in which iodoethane is used as an inert organic solvent and that the reaction temperature is kept between $-95°$ C. and $108°$ C.

* * * * *

UNITED STATES PATENT AND TRADEMARK OFFICE
CERTIFICATE OF CORRECTION

PATENT NO. : 5,034,554
DATED : July 23, 1991
INVENTOR(S) : Peter L. Timms et al.

It is certified that error appears in the above-identified patent and that said Letters Patent is hereby corrected as shown below:

Abstract, line 4, change "vacumm" to --vacuum--.

Column 1, line 27, delete "a liquid".

Column 2, line 20, change "1-methylnaphtalene" to --1-methylnaphthalene--.

Column 2, line 53, change "than" to --that--.

Col. 4, line 16, delete "point less", (second occurence).

Column 4, line 58, delete "any of".

Column 4, line 59, change "1-methylnaphtalene" to --1-methylnaphthalene--.

Column 4, line 63, change "108°" to -- -108°--.

Column 6, line 1, change "1-methylnaphtalene" to --1-methylnaphthalene--.

Column 6, line 5, change "108°" to -- -108°--.

Signed and Sealed this

Twenty-second Day of December, 1992

*Attest:*

DOUGLAS B. COMER

*Attesting Officer*      *Acting Commissioner of Patents and Trademarks*